Figure 1:
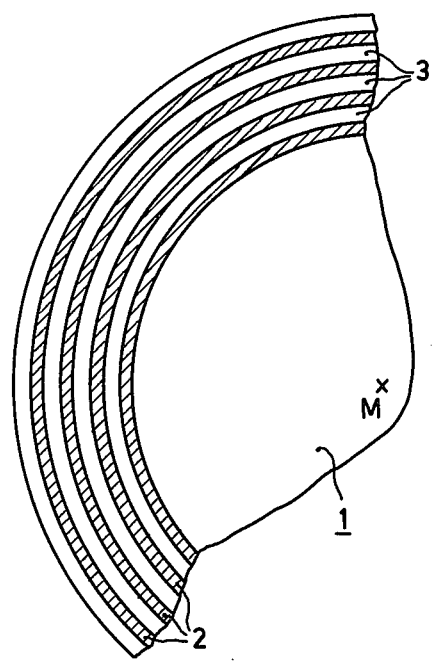

United States Patent [19]
Braat

[11] 3,962,720
[45] June 8, 1976

[54] RECORD CARRIER ON WHICH A TELEVISION SIGNAL IS STORED

[75] Inventor: Josephus Johannes Maria Braat, Eindhoven, Netherlands

[73] Assignee: U.S. Philips Corporation, New York, N.Y.

[22] Filed: Dec. 6, 1974

[21] Appl. No.: 530,165

[30] Foreign Application Priority Data
Oct. 3, 1974 Netherlands............... 7413044

[52] U.S. Cl................ 358/4; 178/6.6 R; 179/100.3 V
[51] Int. Cl.² ............... H04N 5/76; H04N 9/00
[58] Field of Search.............. 178/6.6 DD; 358/4; 179/100.3 V; 340/173 LM

[56] References Cited
UNITED STATES PATENTS

| | | | |
|---|---|---|---|
| 3,530,258 | 9/1970 | Gregg et al. | 179/100.3 V |
| 3,624,284 | 11/1971 | Russell | 340/173 LM X |
| 3,876,842 | 4/1975 | Bouwhuis | 179/100.3 V X |

Primary Examiner—Robert L. Griffin
Assistant Examiner—Mitchell Saffian
Attorney, Agent, or Firm—Frank R. Trifari; Simon L. Cohen

[57] ABSTRACT

A record carrier is described in which a television signal is stored in an optically readable information structure of trackwise arranged areas alternating with intermediate areas. The tracks exhibit an undulation. The luminance information is contained in the spatial frequency of the areas and the other information, for example chrominance and sound information, in the variation of the undulation. The luminance information and the other information can be read independently by means of a suitable detector arrangement.

5 Claims, 22 Drawing Figures

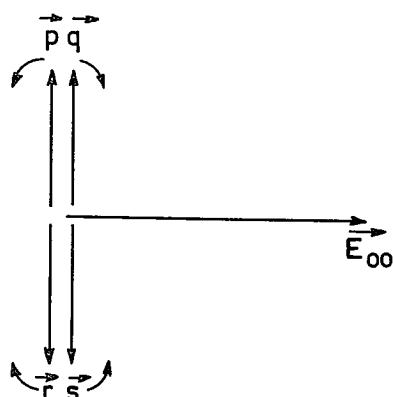
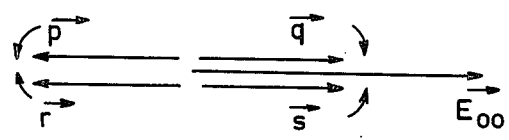
Fig.10a  Fig.10b
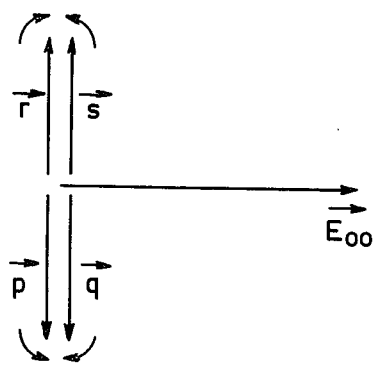
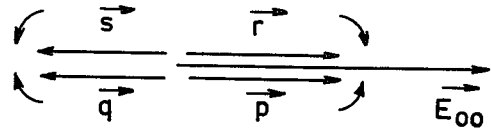
Fig.10c  Fig.10d
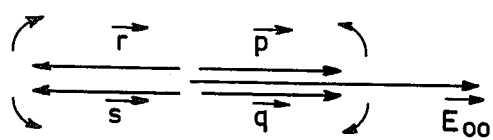
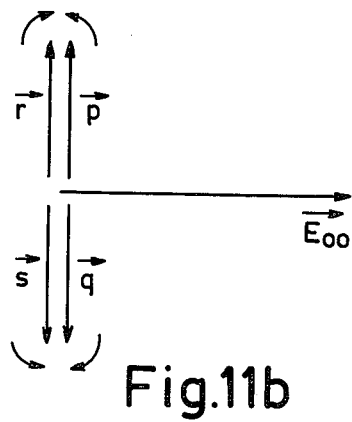
Fig.11a  Fig.11b

RECORD CARRIER ON WHICH A TELEVISION SIGNAL IS STORED

The invention relates to a record carrier on which a television signal is stored in an information structure of trackwise arranged areas alternating with intermediate areas, which structure is readable with optical radiation and which areas influence a read beam of radiation in a different manner than the intermediate areas, the television signal comprising a first carrier wave which is frequency modulated with the luminance information and further carrier waves which are modulated with other information, for example chrominance and sound information. The invention also relates to an apparatus for reading such a record carrier.

In the case of a color television signal, the "other" information is chrominance and sound information, which sound may be modulated on one, two or even four carrier waves. In the simplest case the television signal is a black-white signal and the sound is modulated on one carrier wave. The track-shaped structure may consist of a spiral track which extends over a multitude of revolutions on the record carrier; it may also consist of a multitude of concentric tracks.

In "Philips' Technical Review", 33, No. 7, pages 181 – 185, a round disc-shaped record carrier is described, the luminance information and the chrominance and sound information being contained in one optically readable track in a binary coded manner. The information track comprises a multitude of pits which have been pressed into the record carrier surface. The luminance information is contained in the spatial frequency of the pits, while the chrominance and sound information is recorded as a modulation of the lengths of the pits (a so-called "duty cycle" modulation).

When writing on the known record carrier, a write beam of radiation is intensity modulated by for example an electro-optic modulator, to which a rectangular signal in accordance with the information to be written is applied. When electronically composing said rectangular signal from the luminance information and the chrominance and sound information limitations in the signal are necessary so that higher harmonics are produced. If all information is contained in the lengths of the areas and of the intermediate areas, this may result in mixing products of the first and the further carrier waves during reading. Such mixing products are undesirable. If a mixing product appears in the frequency band covered by the modulated first carrier wave, this gives rise to interference, so called moire, in the luminance signal which is read from the record carrier and reproduced. Similarly, a mixing product of a frequency within the frequency bands occupied by the modulated further carrier waves results in interference in for example the chrominance signal which is read from the record carrier and reproduced. Which mixing products occur and the disturbing effect of said mixing products depends on the choice of the carrier frequencies on the one hand and on the photochemical process and the signal processing circuits used during recording on the other hand.

It is an object of the present invention to transmit a television signal by means of a record carrier, while minimizing the occurrence of mixing products of the luminance information and the other information. For this, a record carrier according to the invention is characterized in that the tracks of the information structure exhibit an undulation, that only the first carrier wave is defined by the spatial frequency of the areas, while the further carrier waves determine the variation of the undulation of the tracks, the undulation amplitude being substantially smaller than the period of the track structure in a direction transverse to the direction in which the tracks are read and the frequency of the first carrier wave being at least twice as high as the frequency of the further carrier waves. An undulation is to be understood to mean an oscillation which consists of sinusoidal excursions whose frequency and/or amplitude vary along a track.

By means of a read method to be described hereinafter the information contained in the spatial frequency of the areas can be detected separately from the information contained in the undulation of the tracks. There is substantially no interaction between the information bands. By employing a record carrier according to the invention a system for the transmission of a television signal can be obtained with two substantially independent optical channels. The main advantage of this is that the frequency bands and the signals stored in said channels may overlap one another.

An apparatus for reading a record carrier according to the invention, which apparatus comprises a radiation source and an objective system for supplying via the record carrier radiation originating from the radiation source to a radiation-sensitive information detection system, which detection system converts the radiation which is supplied by the radiation source and modulated by the information structure into an electric signal, is characterized in that the information detection system consists of four radiation sensitive detectors which are disposed in the effective exit pupil of the objective system, the detectors being disposed in four different quadrants of an imaginary x-y co-ordinate system through the center of the exit pupil, whose x-axis extends is effectively in the longitudinal direction and whose y-axis is effectively in the lateral direction of the tracks.

With "effectively" in the longitudinal direction and in the lateral direction of the tracks respectively is meant that when the detectors are projected on the information plane of the record carrier a set of detectors occupy different positions viewed in the longitudinal direction and in the lateral direction of the tracks respectively. The effective exit pupil of the objective system is to be understood to mean the actual exit pupil of said system if said pupil is readily accessible. The effective exit pupil may also be constituted by an image formed by a field lens or by a shadow image of the actual pupil if this is difficulty accessible.

A preferred embodiment of a read apparatus according to the invention, which apparatus is particularly suited for reading a record carrier whose areas cause a difference in optical pathlength in the read beam which is approximately an odd multiple of a quarter wavelength of the radiation to be used for reading, is characterized in that the output terminals of the detectors which are disposed in the first and in the second quadrant are connected to a first summing device and the output terminals of the detectors which are disposed in the third and in the fourth quadrant to a second summing device, the first and the second summing device being connected to a differential amplifier at whose output the information of the modulated further carrier waves is available, and that the output terminals of detectors which are disposed in the first and in the fourth quadrant are connected to a third summing device and the output terminals of the detectors which are disposed in the second and in the third quadrant to a fourth summing device, the third and the fourth summing device being connected to an amplifier at whose output the information of the modulated first carrier wave is available.

It is to be noted that it has been proposed in the published German Patent Application No. 2,342,906 which has been laid open for public inspection, to employ four detectors in an apparatus for reading an optical information structure. In the known apparatus, however, the information detection system consists of two detectors only, which detectors are employed to read the information which is contained in the spatial frequency of the areas. The two other detectors are used for determining the degree of centering of the read spot relative to a track to be read. The system for transmitting a television signal by means of a record carrier according to the invention differs from that described in the cited German Patent Application in that television information is also present in a direction transverse to the track direction.

Figure 2:
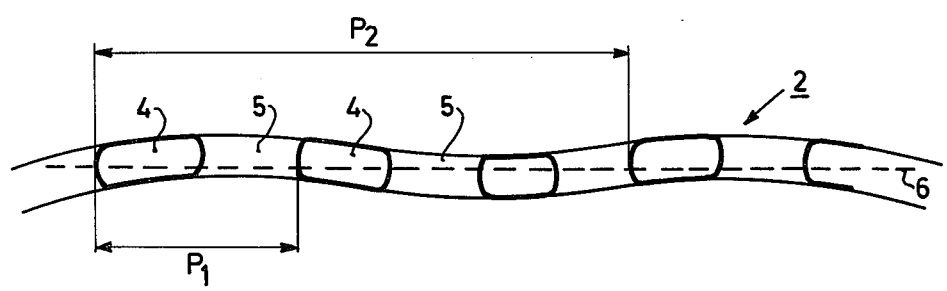
Figure 3:
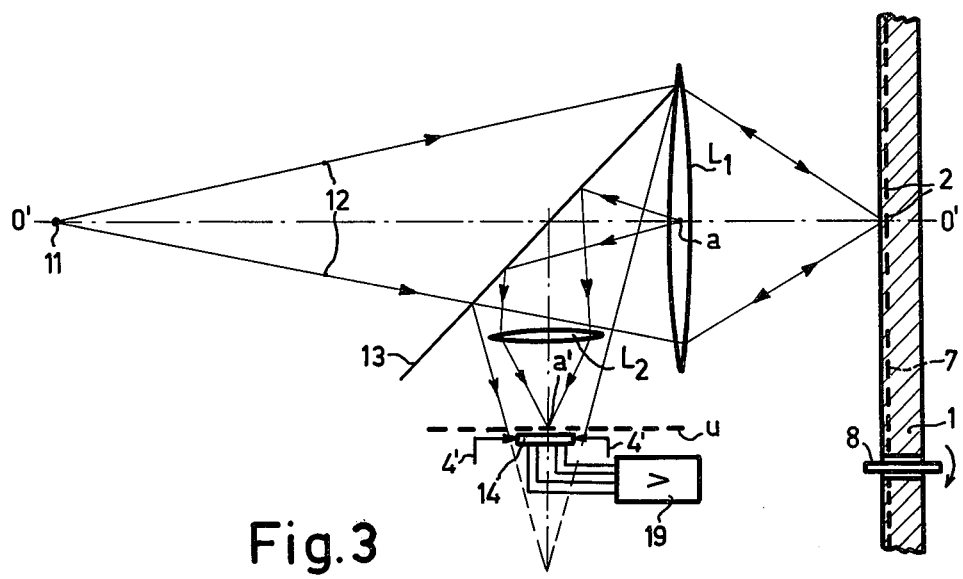
Figure 4:
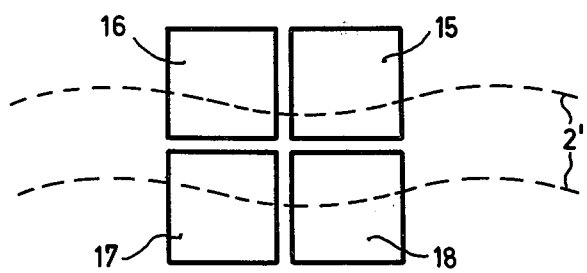
Figure 5:
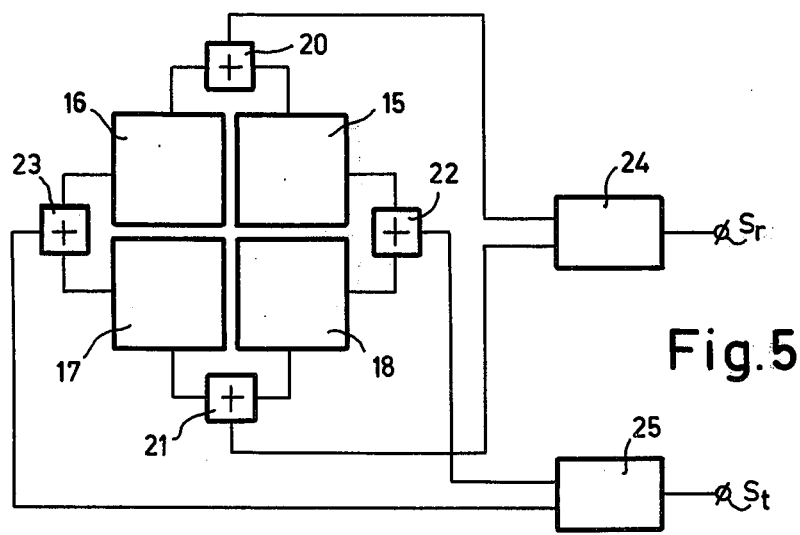
Figure 12:
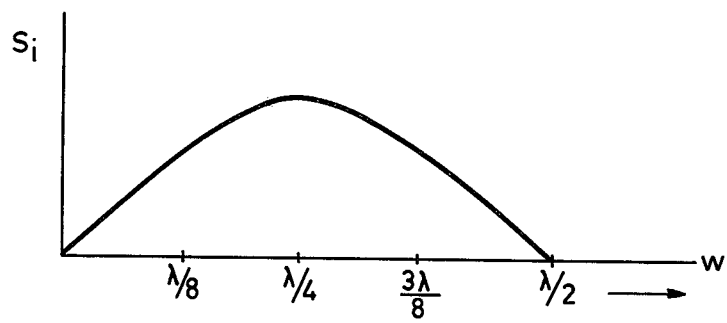

The invention will now be described with reference to the drawing, in which:

FIG. 1 schematically shows a part of a round disc-shaped record carrier,

FIG. 2 greatly magnified shows a part of one track of an information structure according to the invention, FIG. 3 shows an embodiment of an apparatus for reading a record carrier according to the invention, FIG. 4 shows the detection system used in said apparatus, FIG. 5 illustrates an example of signal processing in the said apparatus, FIGS. 6 through 11b and FIGS. 13 through 15 illustrate the mechanism of reading, and FIG. 12 shows the amplitude of the detected signal as a function of the difference in optical pathlength caused by an undulating track.

FIG. 1 schematically shows a part of a round disc-shaped record carrier 1, on which a television signal, for example a color television signal is stored. The record carrier is provided with a multitude of tracks 2 alternating with lands 3. In an information structure according to the invention the tracks undulate relative to an average position, as can be seen in FIG. 2, which Figure greatly magnified represents a small part of a track. The dotted line 6 represents the mean average position of the track center taken over a large track length. For the tracks of FIG. 1 the corresponding lines 6 are concentric or quasiconcentric if the track is spiral-shaped. The local period of the undulation is designated $p_2$. Said period is determined by the chrominance and sound information in the case of a color television signal, and consequently varies along a track. The track consists of a multitude of areas 4 alternating with intermediate areas 5. The local period of the areas is designated $p_1$. Said period is determined by the luminance information of the color television signal. The period $p_2$ is approximately three times as great as the period $p_1$. In FIG. 2 the amplitude of the undulation is represented exaggerated. In reality said amplitude is small relative to the period of the track structure in the lateral direction of the tracks, said amplitude being for example 1/10 of the said period.

The track structure of FIGS. 1 and 2 may be regarded as a two-dimensional grating which diffracts the radiation used for reading in a number of directions. As the diffraction caused by the undulation of the tracks takes place in different directions than the diffraction caused by the transitions between the areas and intermediate areas, the information contained in the undulation can be read independently of the information contained in said transitions using a suitable detector arrangement.

As is shown in FIG. 2, the chrominance and sound information can be laid down in the spatial frequency of the undulation. However, it is alternatively possible to record the chrominance and sound information in an amplitude modulation of an undulation of constant period. Furthermore, it is possible to modulate the undulation of the tracks both in frequency and in amplitude, the chrominance information being for example recorded in the spatial frequency of the undulation and the sound information in the amplitude of said undulation.

The information structure is preferably a phase structure, i.e. the phase of a read beam of radiation is modified thereby. The areas are for example disposed at a different depth in the record carrier than the intermediate areas and the lands. The record carrier may be radiation-reflecting or radiation-transmitting. For a satisfactory reading of a phase structure the distance between the plane of the areas and that of the intermediate areas must be such that radiation which has passed an area or which is reflected at an area traverses an optical pathlength which is approximately $(2n + 1) \lambda/4$ shorter or longer than the optical pathlength covered by radiation which has passed through or is reflected at an intermediate area. In this respect the optical pathlength is the product of the actual pathlength and the refractive index of the medium in which said path extends. $\lambda$ is the wavelength of the radiation used for reading and $n = 0, 1, 2$ etc. For a record carrier having a reflecting information structure which adjoins air, for example, the distance between the plane of the areas and that of the intermediate areas should be approximately $(2n+1) \lambda/6$.

FIG. 3 shows an embodiment of an apparatus according to the invention for reading a reflecting record carrier. A radiation source 11, for example a laser, emits a read beam 12. Said beam is focussed onto the information plane 7 of the record carrier 1 by an objective system, which is schematically represented by a single lens $L_1$. The record carrier is shown in radial cross-section. The tracks are designated 2. The beam which is reflected by the record carrier and modulated by the information structure passes the objective $L_1$ for a second time, and is subsequently reflected, for example by a semi-transparent mirror 13, to a schematically shown radiation-sensitive information detection system 14. The output terminals of said system are connected to an electronic circuit 19, in which the signals from the detectors are added and subtracted in a specific manner. The resulting signals subsequently be decoded.

According to the invention the detection system 14 is disposed in the plane of the effective exit pupil of the objective system $L_1$. Said effective exit pupil may be an image of the actual exit pupil formed by a field lens $L_1$. For clarity the Figure only shows the image a' of one point a of the exit pupil. The effective exit pupil may also consist of one of the shadow images of the actual exit pupil. If the actual exit pupil of the objective system is suitably accessible, it is obvious that the detector system may also be disposed in said exit itself.

FIG. 4 shows the detection system 14 in top plan view (a section at the line 4' 4'' in FIG. 3). The system consists of four radiation sensitive detectors 15, 16, 17 and 18. To show the positions of said detectors relative to the track structure, the projection 2' of a track which is being read is drawn on the information detection system.

By rotating the record carrier 1 about an axis 8 and by radially moving the optical reading system and the record carrier relative to one another, signals which represent the stored information are obtained at the outputs of the detectors 15, 16, 17 and 18.

FIG. 5 shows how said signals can be processed. The output signals of the detectors 15 and 16 are applied to a summing device 20, and the output signals of the detector 17 and 18 to a summing device 21. The signals supplied by said summing devices are applied to a differential amplifier 24 at whose output a signal $S_2$ appears, which represents the information contained in the undulation of the tracks. The information contained in the variable spatial frequency of the areas can be recovered by applying the output signals of the summing devices 22 and 23, whose inputs are connected to the detectors 15, 18 and 16, 17 respectively, to a differential amplifier 25, yielding a signal $S_t$.

The principle of reading will now be explained with reference to FIGS. 6, 7, 8, 9, 10, 11, 13, 14 and 15.

Figure 6:
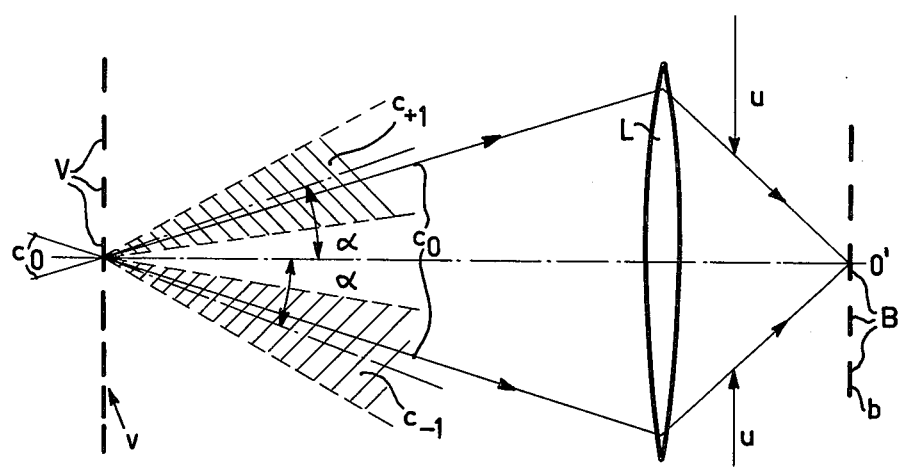

By a lens L, which exhibits no aberration, a faithful image B can be formed in the image plane b of an object V which is located in an object plane v (compare FIG. 6). The object information which is transmitted by the lens is present in the beam cross-section in a plane through an arbitrary point along the optical axis 00' and perpendicular to said axis. However, in the plane u of the exit pupil of the lens L certain information can be detected which in practice often cannot be observed separately from other information in the image plane.

Figure 7:
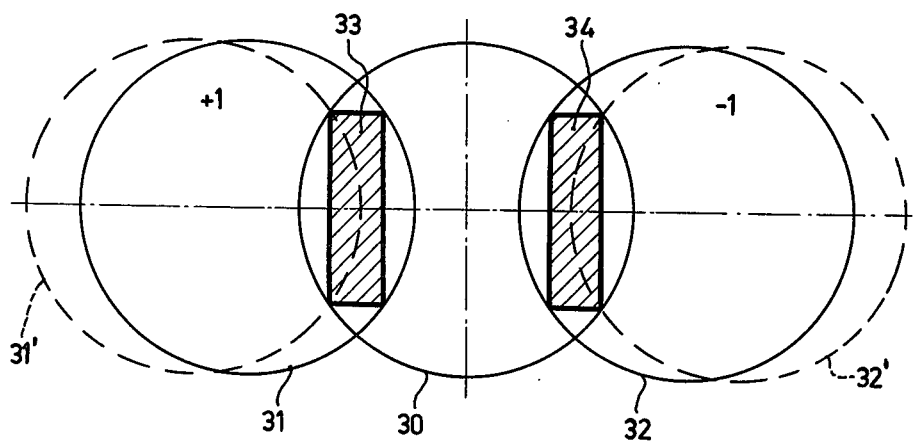

If the object is grating, a radiation beam c is divided by the grating into a zero-order beam $c_0$, two first-order beams $c_{+1}$ and $c_{-1}$ and a number of higher-order beams which are not shown. The zero-order beam by itself contains no information about the object; said information is distributed over the beams of other orders. Provided that the lens pupil is sufficiently large, all orders together produce a faithful image of the grating in the image plane. The individual orders cannot be distinguished in the image plane b. However, in the plane u of the exit pupil the orders are more or less separated. FIG. 7 shows the situation in said plane.

The circle 30 in FIG. 7 represents the exit pupil, the circles 31 and 32 representing the cross-sections at the location of the exit pupil of the +1 and the −1 order beam respectively. The positions of the circles 31 and 32 in the plane of the exit pupil are determined by the period of the grating. The angle α between the chief rays of the first-order beams and the chief ray of the zero-order beam is given by: $\sin\alpha = \lambda/p$, p being the grating period and λ the wavelength of the radiation of the beam c. At decreasing grating period the diffraction angle α increases (compare the dotted circles 31' and 32'). At increasing grating period the +1 and −1 order beams will overlap each other increasingly. By disposing a separate detector (33 and 34 in FIG. 7) in the left and right pupil half, the +1 and −1 order beams can be detected separately by measuring their effect on the zero-order beam.

The track-shaped information structure of a record carrier according to the invention may be considered a grating. However, said grating has some special properties. First of all, the tracks are not straight, but exhibit an undulation. Furthermore, the tracks are not continuous tracks, but consist of discrete areas. Finally, the tracks move relative to the objective system. The track-shaped information structure with undulating tracks which consist of discrete areas diffracts the radiation used for reading into a number of differently oriented first-order beams, a number of differently oriented second-order beams etc., depending on the information stored. The effect of the undulation of a continuous track on the read beam will now be discussed next.

Figure 8:
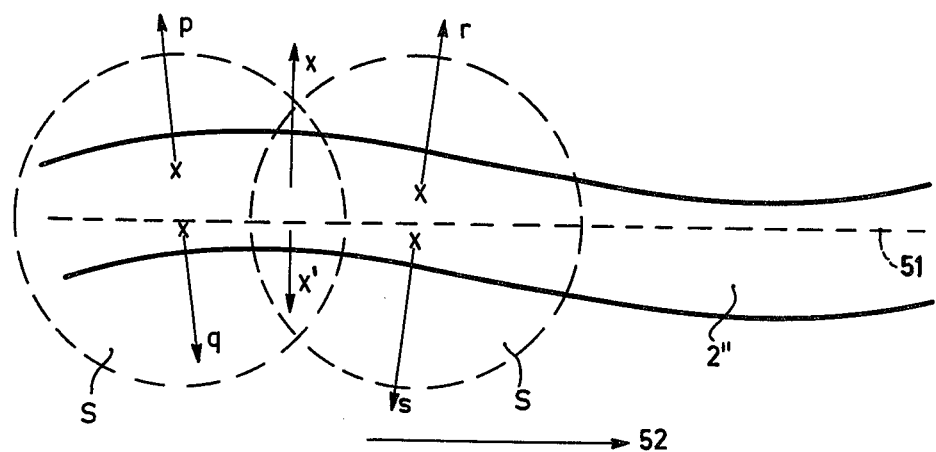

FIG. 8 shows a small portion of a continuous track 2''. The track is illuminated by a read spot of radiation S. During reading the read spot and the information track move relative to each other in the direction of the arrow 52. A tracking system ensures that the read spot S and the exit pupil of the objective are always substantially centered at the dotted line 51. Said dotted line represents the average position of the track center taken over a great distance. Owing to the undulation of the track the radiation is diffracted into inter alia the directions indicated by the arrows p, q, r and s. The beams diffracted in these directions are of importance in reading the information contained in the undulation.

Figure 9:
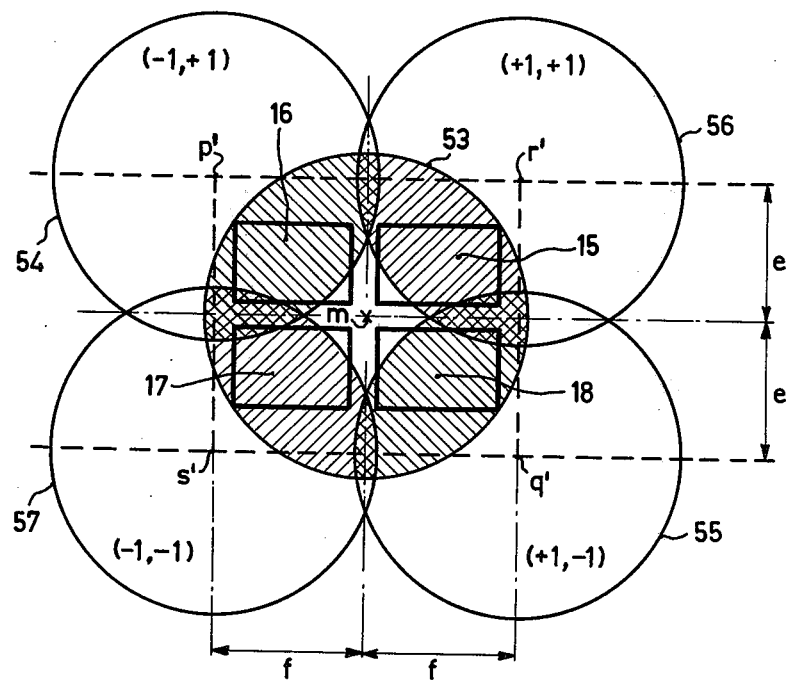

The situation of FIG. 9 occurs in the plane of the exit pupil. The central circle 53 represents the size of the exit pupil. The cross-sections of the (−1,+1), (+1,−1), (+1,+1) and (−1,−1) order beams at the location of the exit pupil, which beams are diffracted in the directions p, q, r and s of FIG. 8, are represented by the circles 54, 55, 56 and 57. Said circles, with the centers p', q', r' and s' have the same radius as the circle 53. The distance e in FIG. 9 is determined by $\lambda/p_r$, $p_r$ being the period of the track structure in a direction transverse to the direction of reading. Said period may be assumed to be constant. The distance f in FIG. 9 is a function of $\lambda/p_t$, $p_t$ being the period of the undulation in the direction of reading.

FIGS. 10a, 10b, 10c and 10d show the variation of the phases of the various first-order beams relative to the zero-order beam. The electric field vector $\overline{E_{00}}$ of the zero-order beam (0,0) as well as those of the first-order beams rotate with the velocity of light. For a certain point in a track the (−1,+1) order beam has a phase vector $\bar{p}$ which makes a certain angle with the vector $\overline{E_{00}}$. The (+1,−1) order beam has a phase vector $\bar{q}$ at the same angle with the vector $\overline{E_{00}}$ as the phase vector $\bar{p}$. When the information track moves relative to the read spot, as is indicated in FIG. 8, the phase angle of the order which is diffracted to the right will increase and that of the order which is diffracted to the left will decrease. When reading the undulating track the vectors $\bar{p}$ and $\bar{q}$ will consequently rotate in opposite directions. The vectors $\bar{r}$ and $\bar{s}$ correspond to the (+1,+1) and (−1,−1) order beams. These vectors also rotate in opposite directions during reading of the track. On account of symmetry the vectors $\bar{r}$ and $\bar{s}$ have directions opposite to those of the vectors $\bar{p}$ and $\bar{q}$. Starting from the initial situation of FIG. 10a, the situation of FIG. 10b will occur after the read spot has moved in the direction of reading over a distance equal to a quarter of the local tangential period. FIG. 10c represents the situation after the read spot has moved in the direction of reading over a distance equal to half the local tangential period, and FIG. 10d the situation after coverage of a distance equal to three quarters of the local tangential period. After a movement of the read spot over a distance equal to a full local tangential period, the situation of FIG. 10a is restored.

The components of the vectors $\bar{p}$ and $\bar{r}$ in the direction of the vector $\overline{E_{00}}$ decreases from 0 (FIG. 10a) to a minimum value (FIG. 10b), become zero again (FIG. 10c) and subsequently become a maximum (FIG. 10d). For the components of the vectors $\bar{q}$ and $\bar{s}$ in the direction of the vector $\overline{E_{00}}$, the variation is the other way round, viz. from 0 to a maximum, then to zero again and subsequently to a minimum.

In the overlapping areas of the (−1,+1), (+1,+1), (+1,−1) and (−1,−1) order beams with the (0,0) order beam, which areas are shown hatched in FIG. 9, there is alternately constructive and destructive interference, so that the intensities in said areas increase and decrease alternately. The intensity variations, which are determined by the variation of the undulation, and thus by the information stored, can be detected with the radiation-sensitive detectors 15, 16, 17 and 18 (FIG. 9). The intensity variations resulting from the diffraction in the directions p and r are mutually in phase and in phase opposition with the intensity variations as a result of the diffraction in the directions q and s. The signals supplied by the detectors 15 and 16 as well as those supplied by the detectors 17 and 18 are added. Each of the sum signals exhibits a variation in time which corresponds to the spatial variation of the undulation of the tracks; however, said signals are 180° phase-shifted. By subtracting the sum signals from each other an information signal $S_r$ of double amplitude can be obtained.

For reading the information contained in the undulation of the tracks, it is possible to replace the two detectors 15 and 16 by one detector with the same surface area as the two detectors 15 and 16. The same applies to the detectors 17 and 18. However, the four detectors are also employed for reading the information contained in the spatial frequency of the areas.

The positions of the centers $p'$, $q'$, $r'$ and $s'$ in FIG. 9 are determined by the period of the track structure in the longitudinal direction of the tracks. At increasing spatial frequencies of the information on the record carrier, in other words at decreasing local periods of the undulation, the centers $p'$, $q'$, $r'$ and $s'$ will move outwards relative to the central circle 53, so that the overlapping areas of the circles 54, 55, 56 and 57 with the circle 53 are reduced. The extent to which the first-order beams interfere with the zero-order beam then becomes smaller. This means that the magnitudes of the signals supplied by the detectors 15, 16, 17 and 18 decrease at higher spatial frequencies of the information on the record carrier.

In the case described above in which the information, for example, chrominance and sound information, is contained in the variable period of the undulation, the electric signal $S_r$ will have constant amplitude and a varying frequency. The information may also be recorded in an amplitude modulation of the undulation. In that case the period $p_r$ should no longer be considered a constant and the centers $p'$, $q'$, $r'$ and $s'$ in FIG. 9 will alternately move up and down during reading of the record carrier. In terms of the vector diagrams of FIGS. 10a, 10b, 10c and 10d this means that the lengths of the vectors vary with the information which is stored, whilst the velocity with which the vectors rotate relative to the vector $\overline{E_{00}}$ is constant. The electric signal $S_r$ then has a constant frequency and a varying amplitude.

FIGS. 10a, 10b, 10c and 10d are based on an initial situation in which the angle between the vectors $\bar{p}, \bar{q}, \bar{r}$ and $\bar{s}$ and the vector $\overline{E_{00}}$ is 90°. This is the case if the tracks of the information structure cause a difference in optical pathlength in the read beam, which is smaller then a quarter of the wavelength of the radiation used for reading. There will then be a maximum phase shift between the first-order beams and the zero-order beam, but in the vector diagram the lengths of the phase vectors are very small, so that the variations in the intensities at the detectors are very small. In practice the most ideal situation is that in which the tracks cause a difference in optical pathlength of a quarter of the wavelength of the radiation used for reading. At the instants indicated in FIGS. 10a, 10b, 10c and 10d two of the phase vectors $p$, $q$, $r$ and $s$ then make an angle of 45° and the other two vectors an angle of 135° with the phase vector $E_{00}$. For the method of reading illustrated in FIG. 5, however, the difference in optical pathlength may vary around the value of a quarter wavelength over a fairly wide range, without the amplitude of the detected signal becoming too small. FIG. 12 shows the amplitude of the detected signal $S_i$ as a function of the difference $w$ in optical pathlength caused by the undulating tracks. This reveals that for differences in pathlength between one eighth of a wavelength and three eighths of a wavelength satisfactory reading is possible of the information contained in the undulation. However, the said method of reading cannot be employed when the tracks cause a difference in optical pathlength of approximately 0 or approximately half a wavelength in the read beam.

FIGS. 11a and 11b show two phase vector diagrams which apply to the last case. FIG. 11a gives the initial situation which corresponds to FIG. 10a, while FIG. 11b represents the situation after the read spot has moved over the track to be read by a distance equal to a quarter of the local undulation period. The sum of the vectors $\overline{E_{00}}$ and $\bar{p}$ and that of the vectors $\overline{E_{00}}$ and $\bar{r}$ will vary little in practice. By adding the output signals of the detectors 15 and 16 a signal is then obtained which varies very little in time, the variation having a frequency which is twice the frequency which corresponds to the spatial frequency of the undulation of the tracks. The electric signal supplied by the summing device 20 in FIG. 5 is then a distorted signal of small amplitude. The same applies to the electric signal supplied by the summing device 21 of FIG. 5.

A record carrier in which the tracks cause a difference in optical pathlength of half a wavelength in the read beam can be read if a signal processing is employed other than that illustrated in FIG. 5. The output signals of the detectors 15 and 16 as well as those from the detectors 17 and 18 are then subtracted from one another. The difference signals thus obtained are applied to a differential amplifier, at whose output the information contained in the undulation of the tracks is available. However, the information signal thus obtained has an inferior signal-to-noise ratio compared with the signal recovered from an information structure whose tracks cause a difference in optical pathlength of substantially a quarter wavelength, with the aid of a signal processing method in accordance with FIG. 5.

Figure 13:
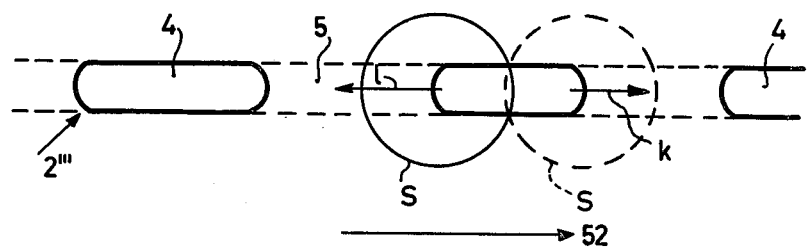

Information is not only contained in the undulation of the tracks, but also in the spatial frequency of the areas. In FIG. 13 a straight track 2′′′ is shown, which consists of areas 4 and intermediate areas 5. Said track is scanned by a read spot of radiation S. The transitions between the areas and the intermediate areas, and vice versa, diffract the read radiation in the directions $k$ and $l$.

Figure 14:
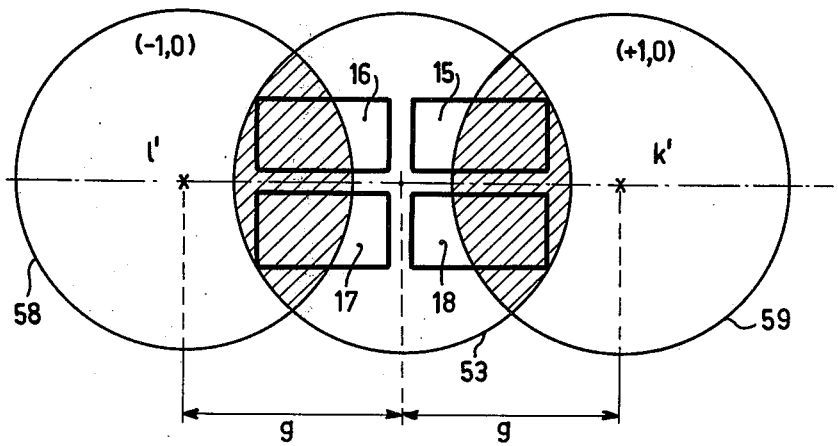

FIG. 14 shows the situation in the plane of the exit pupil of the objective system owing to this diffraction. The circles 58 and 59 represent the cross-sections of the (−1,0) and (+1,0) order beams in said plane, which beams are diffracted in the directions l and k of FIG. 13. The circles 58 and 59 with the centres $l'$ and $k'$ have the same radius as the circle 53, which again represents the exit pupil of the objective system. The distance g is determined by $\lambda/p_g$, $p_g$ being the period of the areas.

Figure 15A:
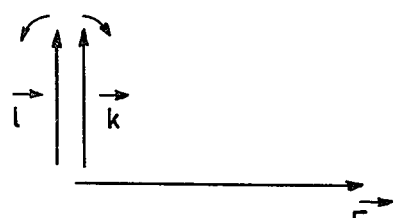
Figure 15B:
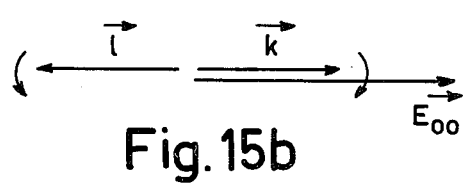
Figure 15C:
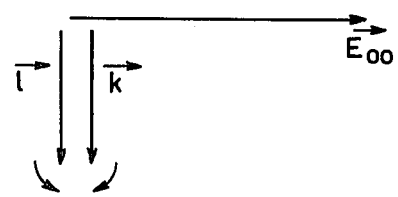
Figure 15D:
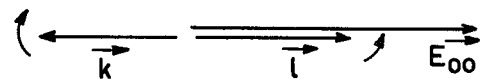

FIG. 15a shows the corresponding phase vector diagram for a specific point in the track in the case that the areas cause a difference in optical pathlength in the read beam which is smaller than a quarter wavelength. The vectors $\overline{k}$ and $\overline{l}$ make an angle of 90° with the vector $\overline{E_{00}}$, which is the electric field vector of the (0,0) order beam. If the read spot moves over the track in the direction 52, the phase angle of the beam which is diffracted to the right will increase and that of the beam which is diffracted to the left will decrease. When the information contained in the areas is read, the vectors $\overline{k}$ and $\overline{l}$ rotate in opposite directions relative to the vector $\overline{E_{00}}$. FIGS. 15b, 15c and 15d show the positions of the vectors $\overline{k}$ and $\overline{l}$, each time after the read spot had advanced by a distance equal to a quarter of the local period of the structure of areas. The component, in the direction of the vector $\overline{E_{00}}$, of the vector $\overline{l}$ decreases from 0 to a minimum value, then becomes zero again and subsequently becomes a maximum. For the component, in the direction of the vector $\overline{E_{00}}$, of the vector $\overline{k}$ the variation is the reverse, namely from zero to a maximum, then to zero again and subsequently to a minimum. The overlapping areas of the (+1,0) and (−1,0) order beams with the (0,0) order beam, which are shown hatched in FIG. 14, alternately exhibit constructive and destructive interference, so that the intensities in said areas increase and decrease alternately. The intensity variations, which are now determined by the transitions between the areas 4 and the intermediate areas 5, can be detected with the same detectors 15, 16, 17 and 18 which are employed for reading the information contained in the undulation of the tracks. The intensity variation owing to diffraction in the direction l is in phase opposition to the intensity variation which is caused by diffraction in the direction k. The intensity variations at the detectors 16 and 17 caused by the radiation of the (−1,0) diffraction order, are equal. The output signals of said detectors are added, and the output signals of the detectors 15 and 18 are also added (in the summing devices 21 and 22 of FIG. 5). By subtracting the sum signals thus obtained from each other (in the differential amplifier 25 in FIG. 5), an electric signal $S_t$ is obtained, which signal contains the luminance information of the television signal.

FIGS. 15a, 15b, 15c and 15d are again based on an inital situation in which the angle between the vectors $\overline{k}$ and $\overline{l}$ and the vector $\overline{E_{00}}$ is 90°, which means that the areas cause a difference in optical pathlengths in the read beam which is smaller than a quarter wavelength. However, as in that case the lengths of the vectors $\overline{k}$ and $\overline{l}$ are small relative to the length of the vector $\overline{E_{00}}$, a record carrier is opted for in practice of which the areas cause a difference in optical pathlength of a quarter wavelength in the read beam. In the situation shown in FIG. 15a the vectors $\overline{k}$ and $\overline{l}$ will make an angle of 135° with the vector $\overline{E_{00}}$. Reading of such a record carrier is possible both by subtracting the sum signal of the detectors 16 and 17 from that of the detectors 15 and 18, and by adding the said sum signals. In other words, in FIG. 5 the element 25 may both be a differential amplifier and a sum amplifier. In this respect it is preferred to add said sum signals, because this will also allow an information structure with small spatial frequencies of the areas to be read.

Also when the areas cause a difference in optical pathlength other than a quarter wavelength in the read beam, satisfactory reading of the information (with good signal-noise ratio) contained in the areas is possible. For example, an information structure whose areas cause a difference in optical pathlength equal to half a wavelength can be read satisfactorily, when the signals supplied by two detectors, one of which is disposed in the left and the other in the right pupil half, are added. The areas together form the undulating tracks. The difference in optical pathlength to be caused by the areas is therefore determined by the difference in optical pathlength to be caused by a continuous (undulating) track for said track to be correctly readable. The difference in optical pathlength caused by the areas will therefore range from one eighth of a wavelength to three eights of a wavelength if the signals supplied by the detectors 15, 16, 17 and 18 are processed as illustrated in FIG. 5. Said difference in optical wavelength may still be half a wavelength, if the signals from the detectors 15 and 16 as well as those from the detectors 17 and 18 are subtracted from each other. In the track portion of FIG. 2. the period $p_2$ of the undulation is approx. three times the period $p_1$ of the areas. By composing the tracks of areas, a sort of sampling of the tracks is employed. According to the sampling theory the spatial frequency of the areas should be at least a factor of 2.7 times greater than the spatial frequency of the undulation for a satisfactory signal transmission. There must be an adequate number of areas within an undulation period, in order to avoid too much uncertainty about the phase of the undulation.

In the description of the mechanism of reading only first-order beams have been mentioned. It is obvious that the grating-shaped track structure will also diffract radiation in higher orders. However, the radiation energy in the higher diffraction orders is comparatively low and the diffraction angles are such that only a small part of the higher order beams falls within the pupil of the objective system. For the described method of reading the higher order beams may therefore be neglected.

Furthermore, the (0,+1) and (0,−1) order beams, which are diffracted in the directions $x$ and $x'$ perpendicular to the dotted line in FIG. 8, have been left out of consideration. Said beams do not contain any television information. However, they may be used to control the centering of the read spot relative to the track to be read. For this, use is made of the fact that centering errors will occur with a frequency which is low relative to the frequency of the track undulation which is determined by the television signal. By comparing the low-frequency components of the electric signals supplied by the detectors which are disposed in the upper and lower pupil half a control signal for correcting the position of the read spot relative to a track to be read can be derived.

However, according to the invention it is alternatively possible for the detection of errors in the centring of the read spot, to modulate the high-frequency undulation of the tracks, which is determined by the television signal, with an additional undulation of constant period, which period is an order of magnitude longer than the average period of the high frequency undulation. The additional undulation impresses an additional modulation on the detector signals, whose phase is a measure of the centering of the read spot. From the signals supplied by the detectors a low frequency component may then be extracted for correcting the centering of the read spot in known manner. The use of an undulating track for centering purpose has already been proposed in U.S. Ser. No. 442,396, filed Feb. 14, 1974.

An information structure according to the invention can be written in a record carrier body with the aid of a previously proposed apparatus (U.S. Ser. No. 442,396, filed Feb. 14, 1974). In said apparatus an intensity modulator, for example an electro-optic modulator, and a direction modulator, for example an acousto-optic modulator, are disposed in the path from a radiation source, which supplies a write beam, to a radiation-sensitive surface of a record carrier body. The electrooptic modulator divides the write beam of radiation into a multiplicity of radiation pulses of a certain intensity with the aid of which pulses the areas are recorded in a track. By means of the acousto-optic modulator the direction of the write beam of radiation can be varied through small angles in accordance with a signal applied to said modulator, in such a way that undulating tracks can be written.

What is claimed is:

1. A record carrier on which a television signal is stored in an optically readable form in tracks in the form of first areas alternating with intermediate areas, the record carrier being readable with optical radiation, said first areas influencing a read beam of radiation in a different manner than the intermediate areas, the television signal comprising a first carrier wave which is frequency modulated with the luminance information and further carrier waves which are modulated with other information, the tracks of the information structure exhibiting an undulation, the first carrier wave being defined by the spatial frequency of the first areas, the undulation of the tracks corresponding to the further carrier waves, the undulation amplitude being substantially smaller than the period of the track structure in a direction transverse to the direction in which the tracks are read and the frequency of the first carrier wave being at least twice as high as the frequency of the further carrier waves.

2. A record carrier as claimed in claim 1 on which a color television signal is stored, wherein a carrier wave which is modulated with the chrominance information determines the spatial frequency of the undulation of the tracks, while the carrier waves which are modulated with the sound information determine the amplitude of the undulation.

3. A record carrier as claimed in claim 1, wherein the further carrier waves corresponding to the undulation which is determined by said other information are modulated with a second undulation determining signal, which second undulation determining signal is independent of said other information and results in a spatial frequency on the record which is an order of magnitude smaller than that of the spatial frequency of the undulation caused by the further carrier waves.

4. An apparatus for unidirectionally reading a record carrier in which television information is stored in the form of tracks wherein first and intermediate areas each have different effects on impinging radiation and wherein further information is stored in the form of undulations of the track in a direction transverse to the direction in which the tracks are read, which apparatus comprises a radiation source and an objective system for supplying radiation from the radiation source, via the record carrier, to a radiation sensitive information detection system, which detection system converts the radiation which is supplied by the radiation source and modulated by the first areas, intermediate areas and undulations into an electric signal, wherein the information detection system consists of four radiation sensitive detectors which are disposed in an effective exit pupil of the objective system and the detectors are disposed in four different quadrants of an imaginary x-y co-ordinate system through the center of the exit pupil, whose x-axis effectively extends in the direction in which the tracks are read and whose y-axis effectively extends in a direction transverse to the direction in which the tracks are read.

5. An apparatus as claimed in claim 4, wherein output terminals of the detectors which are disposed in the first and in the second quadrant are connected to a first summing device and output terminals of the detectors which are disposed in the third and the fourth quadrant to a second summing device, the first and the second summing device being connected to a differential amplifier at whose output the information of the modulated further carrier waves is available, and that the output terminals of the detectors which are disposed in the first and in the fourth quadrant to a third summing device and the output terminals of the detectors which are disposed in the second and in the third quadrant to a fourth summing device, the third and the fourth summing devices being connected to an amplifier, said amplifier providing a portion of the recorded television information.

\* \* \* \* \*

UNITED STATES PATENT AND TRADEMARK OFFICE
CERTIFICATE OF CORRECTION

PATENT NO. : 3,962,720
DATED : June 8, 1976
INVENTOR(S) : JOSEPHUS JOHANNES MARIA BRAAT It is certified that error appears in the above-identified patent and that said Letters Patent are hereby corrected as shown below:

IN THE SPECIFICATION

Col. 7, line 56, after "have" insert --a--;

Col. 8, line 16, "p, q, r and s" should be --$\bar{p}$, $\bar{q}$, $\bar{r}$ and $\bar{s}$--;

line 18, "$E_{00}$" should be --$\overline{E_{00}}$--;

Signed and Sealed this

Fifth Day of October 1976

[SEAL]

Attest:

RUTH C. MASON
*Attesting Officer*

C. MARSHALL DANN
*Commissioner of Patents and Trademarks*